(12) United States Patent
Akishev et al.

(10) Patent No.: US 7,811,407 B2
(45) Date of Patent: Oct. 12, 2010

(54) METHOD FOR PRODUCTION OF SANDWICH PANEL CORE FROM COMPOSITES

(75) Inventors: Niaz Irekovich Akishev, Kazan (RU); Ildus Muhametgaleevich Zakirov, Kazan (RU); Alexandr Vladimirovich Nikitin, Kazan (RU)

(73) Assignees: Otkrytoe Aktsionernoe Obschestvo "Kazansky Nauchno-Isledovatelsky Institut Aviatsionnoi Tekhnologii", Kazan (RU); Airbus, Blagnac Cedex (FR)

( * ) Notice: Subject to any disclaimer, the term of this patent is extended or adjusted under 35 U.S.C. 154(b) by 394 days.

(21) Appl. No.: 10/581,457

(22) PCT Filed: Dec. 11, 2003

(86) PCT No.: PCT/RU03/00549
§ 371 (c)(1),
(2), (4) Date: Jun. 1, 2006

(87) PCT Pub. No.: WO2005/056278
PCT Pub. Date: Jun. 23, 2005

(65) Prior Publication Data
US 2007/0182064 A1    Aug. 9, 2007

(51) Int. Cl.
*B29C 65/00* (2006.01)
*B32B 37/00* (2006.01)

(52) U.S. Cl. .................. 156/307.1; 156/197; 156/204

(58) Field of Classification Search .............. 156/307.1, 156/307.3, 197, 201, 204, 205, 206, 292; 264/294, 347
See application file for complete search history.

(56) References Cited

U.S. PATENT DOCUMENTS 4,347,287 A * 8/1982 Lewis et al. .................. 428/378

(Continued)

FOREIGN PATENT DOCUMENTS

EP    0 622 174    11/1994

(Continued)

OTHER PUBLICATIONS

V. N. Krysin et al., "Technological processes of structures shaping, winding and gluing", Moscow, Mashinostroyeniye, 1989, 240 p., p. 118-125, ISBN 5-217-00533-5.

(Continued)

*Primary Examiner*—John L Goff
(74) *Attorney, Agent, or Firm*—Oblon, Spivak, McClelland, Maier & Neustadt, L.L.P.

(57) ABSTRACT

The invention can be defined in its most general form as a technology for production of corrugated structures from foliated composite materials and can be used for production of sandwich panels used in aircraft construction, shipbuilding, and in building units. Method for production of sandwich panel core from composites including the placing of the blank from reinforcing material, the impregnation of the blank with binder obtaining thus the prepreg, the hardening of the binder in the course of hot-pressing and obtaining of the plane semi-finished-blank in the form of a set of relatively rigid parts having the form of the core ridges and detached of one another for some distance, the after-deformation of the semi-finished-blank and obtaining the core relief with the required geometrics, and the final hardening of the applied binder involves the impregnation of the reinforcing material with hinder along the full surface of the blank, the heat supply for hardening of the binder in the obtained prepreg within the bounds of said parts, and creation of conditions slowing down the process of hardening along the prepreg zones between said parts. The width of the prepreg zones between the parts having the form of the core ridges is provided in the course of hot-pressing and is not less than double radius of the blank material bending at these parts when shaping the core.

10 Claims, 1 Drawing Sheet

U.S. PATENT DOCUMENTS 5,556,496 A * 9/1996 Sumerak .................... 156/166
6,132,546 A    10/2000 Diaz et al.

FOREIGN PATENT DOCUMENTS

| GB | 2259044 A  * | 3/1993 |
| JP | 04244834 A  * | 9/1992 |
| JP | 09-011372 | 1/1997 |
| RU | 2052604 C1 * | 1/1996 |
| RU | 2057647 C  * | 4/1996 |

OTHER PUBLICATIONS

V. I. Khaliulin, "Technological schemes for sandwich structures production", KSTU, Kazan, 1999, 168 p., p. 149-155, ISBN 5-7579-0295-7.

* cited by examiner

METHOD FOR PRODUCTION OF SANDWICH PANEL CORE FROM COMPOSITES

TECHNICAL FIELD

The invention can be defined in its most general form as a technology for production of corrugated structures from foliated composite materials.

BACKGROUND ART

Known is a method for production of articles from foliated composite material including the placing of impregnated fabric sheet (prepreg) onto the shaping mandrel, the pressurization with the use of vacuum bag, and the shaping of the article under the influence of atmospheric pressure (V. N. Krysin, M. V. Krysin, Technological processes of structures shaping, winding and gluing. Moscow, Mashinostroyeniye, 1989.-240 p., p. 118-125, ISBN 5-217-00533-5).

The main short-comings of herein-presented method are the low output due to high labor expenditures for prepreg sheet placing into the form with complicated relief, the impossibility to produce the folded structure core with dense relief, and expensive relief tooling.

Known is a method for corrugated core shaping with the use of transformable mandrels. This method involves the placing of composite material in the form of prepreg onto the tooling plane surface which is transformed then into the folded structure with the relief geometries required whereupon the folded structure is shaped. For that, with the aim to obtain the high technical characteristics, the given device with the article is put into the autoclave where all the required operating practices realize: the pressure (up to 0.6-0.8 MPa) and the temperature (up to 200° C.) (V. I. Khaliulin, Technological schemes for sandwich structures production, KSTU, Kazan, 1999.-168 p., p. 149-155.—ISBN 5-7579-0295-7).

The main short-coming of herein-presented method is the necessity to expose the shaping tooling to high temperature and pressure resulting in reduction of technological lifespan.

Known is a method for production of articles from foliated composite material including at its first stage the binder discrete application onto the preliminarily marked-out fabric plane sheet along the parts corresponding to folded type core side ridges obtaining thus the zones of unimpregnated fabric along the bond lines of said ridges. At the second stage the unimpregnated fabric in its plane state is put between the heated slabs of the press whereupon under certain temperature and pressure the binder is hardened. At the third stage the development is deduced from the plane state by means of folding-bending along the unimpregnated zones of the fabric. With the aim to impart rigidity to the core, the unimpregnated zones are impregnated with binder whereupon the binder is hardened (RF Patent no. 2,057,647 C1, Int. Cl.: B 29 D 9/00. Method for core production from composite material.—Bulletin no. 10 of 10.04.96). The given method is taken as a prototype.

The main short-coming of herein-presented method is the impossibility to execute the first stage when using thin fabrics. The thickness of fabrics used in production of composite articles is 0.1-0.2 mm while the width of unimpregnated fabric parts along the core side edges splice lines should be 0.2-0.4 mm so as to obtain the high accuracy of relief geometries.

Since the material of prepreg reinforcing base (glass fabric, carbon fabric, etc.) has the capillary-porous structure, when applying the binder onto the parts that correspond to folded structure side ridges the binder may penetrate to the zones of bending lines. In this case at the next stage (shaping) when supplying heat to the blank, the active hardening of binder will take place at this zones too; it will disable the blank of mobility along the bending lines and will impede the process of plane blank transformation to 3-D structure.

Since the impregnated fabric is not solid, when placing it onto the press slab for further shaping, required is the accurate correspondence of real ridges dimensions and bending lines with the parameters of the core ideal development and, therefore, with the core parameters in its relief state. This condition is difficult-to-realize and requires the special tooling and additional efforts. The warp of fabric in any direction with the marked-out and impregnated ridges and unimpregnated bending lines results in distortion of folded core structure geometrics.

DISCLOSURE OF INVENTION

The invention has for its object to provide the possibility to use the ready-made semifinished-prepreg as the core blank and to improve the conditions of folding the plane blank into the relief 3-D structure.

The technical result attained at executing of the claimed invention is the increase of output of the core from composite material production process making use of the ready-made prepreg as its blank and, therefore, the reduction of the operations quantity, as well as the improvement of production quality owing to improvement of the shaping accuracy.

In accordance with the stated technical solution the stated technical result is attained by that in the known method for production of sandwich panel core from composites including the placing of the blank from reinforcing material, the impregnation of the blank with binder obtaining thus the prepreg, the hardening of the binder in the course of hot-pressing and obtaining of the plane semifinished-blank in the form of a set of relatively rigid parts having the form of the core ridges and detached of one another for some distance, the after-deformation of the semifinished-blank and obtaining the core relief with the required geometries, and the final hardening of the applied binder:

1) the reinforcing material is impregnated with the binder along the full surface of the blank, the heat for hardening of the binder in the obtained prepreg is supplied only within the bounds of said parts, and along the prepreg zones between said parts created are the conditions slowing down the process of hardening;

2) the width of the prepreg parts between the zones having the form of the core ridges is provided in the course of hot-pressing and is not less than double radius of the blank material bending at these parts when shaping the core.

The undertaken by the applicant state of the art analysis shows that there are no analogs characterized by the combination of the features identical to those of the invention. Therefore, the claimed technical solution satisfies the "novelty" condition of patentability.

The results of retrieval for the known solutions in the given area with the aim to reveal the features identical with distinctions of the claimed technical solution show that its features do not result from the state of the art. From the defined state of the art the applicant managed to reveal no influence of the specified essential features upon the attainment of the stated technical result. The claimed technology, therefore, satisfies the "inventive step" condition of patentability.

BRIEF DESCRIPTION OF DRAWINGS

The FIGS. 1-2 present the essence of the invention.

BEST MODE FOR CARRYING OUT THE INVENTION

At the first stage the prepreg plane sheet being the preliminarily impregnated with binder and preserved in such condition reinforcing fabric (glass fabric, carbon fabric, etc.) is placed onto the press heated slab plane surface and the blank is hot-pressed. At the same time the heat is supplied only along the parts 1, which have the shape of core sides and whose area is less than that of the sides, within the crash time sufficient to provide the degree of cure meeting the requirements of the following core shaping by means of bending. In the issue, obtained is the transformable structure consisting of relatively rigid elements (the sides of the prospective core) and prepreg flexible parts in the zones between them.

Figure 1:
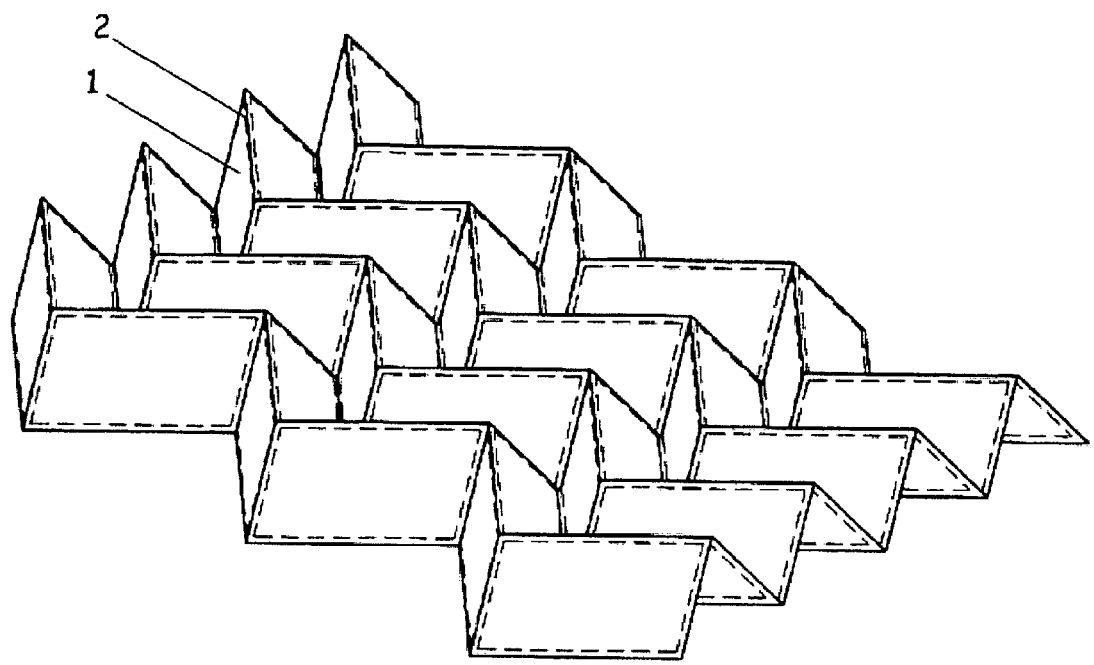
FIG. 1 is the folded core of "z-crimp" type.
Figure 2:
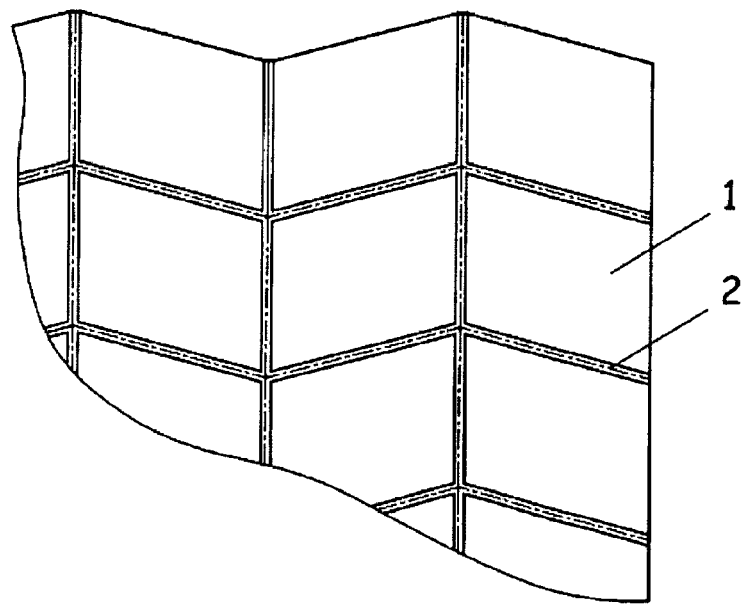
FIG. 2 is the folded core development.
The FIGS. 1-2 present the following positions:
1 are the hardened in the course of hot-pressing prepreg parts; 2 are the parts hardened after the core shaping.

At the next stage the folded structure is shaped by means of semifinished-blank bending-folding along the parts 2 attaining the geometries required (FIG. 1).

With the aim to stiffen the structure the total amount of the applied binder in the core plane is hardened wherewith the article shape is stabilized. This operation can be cancelled or combined with the core-skin assemblage operation, e.g. with the use of film adhesive, attaining thus the sandwich panel. In the last case the existing at this stage core material flexibility in the zone of folded structure ridges, i.e. on the sites of connection with skins, allows improving the quality of bonding owing to absolute contact along the full length. In case of need when assembling with the skins, the curvilinear parts on the bends can be deformed so that the plane areas are formed providing the bond strength hardening.

The claimed method allows using as the blank the ready-made prepreg produced by high-output equipment with the use of industrial methods providing the high quality of impregnation which results in reduction of labor expenditures for core production, improvement of the article quality and the corporate culture.

INDUSTRIAL APPLICABILITY

The invention can be used for production of sandwich panels used in aircraft construction, shipbuilding, and in building units.

The invention claimed is:

1. A method for production of a sandwich panel core from composites, the method comprising:
placing of a blank from a reinforcing material;
after impregnation of the blank with a binder along a full surface of the blank to obtain a prepreg, hardening the binder during hot-pressing, wherein heat for the hardening of the binder in the prepreg is applied within boundaries of prepreg parts, and conditions slowing down the hardening along the prepreg between said parts are created to obtain a planar semifinished-blank comprising a set of substantially rigid parts in both longitudinal and transverse directions of the blank detached from each other and having a shape of core sides;
after deformation of the semifinished-blank, obtaining a core with required geometries; and
final hardening of the binder, wherein
the obtained core is a folded 3-D structure with planar sides and ridges, the ridges connecting the core with skins of a sandwich panel.

2. The method according to claim 1, wherein a width of the prepreg between the parts having the shape of the core sides is not less than double a radius of a blank material bending at the parts.

3. The method according to claim 1, wherein the impregnating the blank comprises preserving the blank in a reinforcing fabric.

4. The method according to claim 3, wherein the reinforcing fabric includes glass fabric or carbon fabric.

5. The method according to claim 1, wherein the final hardening of the binder comprises assemblage of a skin of the sandwich panel to the prepreg.

6. The method according to claim 5, wherein the assemblage is performed with use of a film adhesive.

7. The method according to claim 1, wherein the core is assembled with the skins to form the sandwich panel after the deformation of the semifinished-blank and before the final hardening.

8. The method according to claim 1, wherein the final hardening includes hardening of the ridges of the folded structure and the final hardening occurs after connection of the core with the skins of the sandwich panel.

9. The method according to claim 1, wherein the skins contact the ridges along a full length of the ridges.

10. A method for production of a sandwich panel core, the method comprising:
placing of a sheet blank from a reinforcing material;
impregnation of the blank with a binder along a full surface of the blank to obtain a prepreg;
after the impregnation of the blank, hardening the binder by hot-pressing, heat for the hardening of the binder in the prepreg being applied within boundaries of prepreg parts;
prepreg parts, and conditions slowing down the hardening along the prepreg between said parts are created to obtain a planar semifinished-blank comprising a set of substantially rigid parts in both longitudinal and transverse directions of the blank detached from each other and having a shape of core sides;
deformation of the semifinished-blank to obtain a core with required geometries, the core being a folded 3-D structure with planar sides and ridges;
connecting the ridges with skins to form a sandwich panel; and
final hardening of the binder, including hardening of the ridges of the folded structure, the final hardening occurring after the connecting the ridges with the skins.

* * * * *